(12) United States Patent
Yoon et al.

(10) Patent No.: US 7,856,840 B2
(45) Date of Patent: Dec. 28, 2010

(54) DEHUMIDIFIER

(75) Inventors: Sang Youn Yoon, Busan (KR); Byung Yong Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 657 days.

(21) Appl. No.: 11/450,306

(22) Filed: Jun. 12, 2006

(65) Prior Publication Data
US 2006/0283327 A1    Dec. 21, 2006

(30) Foreign Application Priority Data

| Jun. 15, 2005 | (KR) | 10-2005-0051318 |
| Jun. 15, 2005 | (KR) | 10-2005-0051320 |
| Jun. 20, 2005 | (KR) | 10-2005-0052921 |

(51) Int. Cl.
*F25D 21/14* (2006.01)

(52) U.S. Cl. .......................................... 62/285; 62/291

(58) Field of Classification Search ...................... 62/94, 62/96, 285, 93, 291, 271, 272, 476, 480, 62/495; 96/146; 165/7, 10; 454/201, 233
See application file for complete search history.

(56) References Cited

U.S. PATENT DOCUMENTS

| 3,144,901 A * | 8/1964 | Meek | 96/144 |
| 3,850,007 A * | 11/1974 | McFarlan | 62/305 |
| 5,478,379 A * | 12/1995 | Bevins | 96/119 |
| 5,572,799 A * | 11/1996 | Masuyuki et al. | 34/80 |
| 5,688,305 A * | 11/1997 | Graeff | 95/14 |
| 5,732,562 A * | 3/1998 | Moratalla | 62/94 |
| 5,761,915 A * | 6/1998 | Rao | 62/94 |
| 6,915,655 B2 * | 7/2005 | Lee et al. | 62/271 |
| 7,043,934 B2 * | 5/2006 | Radermacher et al. | 62/285 |

FOREIGN PATENT DOCUMENTS

| CN | 2300029 Y | 12/1998 |
| CN | 2531298 Y | 1/2003 |
| JP | 2004-316952 | 11/2004 |
| JP | 2005-265256 | 9/2005 |

OTHER PUBLICATIONS

International Search Report dated Mar. 13, 2009.
Chinese Office Action Apr. 18, 2008.

* cited by examiner

*Primary Examiner*—Mohammad M Ali
(74) *Attorney, Agent, or Firm*—KED & Associates, LLP

(57) ABSTRACT

The present invention relates to a dehumidifier having high dehumidifying efficiency, low noise and vibration. The dehumidifier includes a case, inlets passed through the case for introduction of air from an outside of the case to an inside of the case, an outlet formed to pass through a top of the case for discharging air dehumidified in the case to the outside of the case, a desiccant assembly for absorbing moisture from air drawn into the case, a blower assembly for drawing air through the inlets and blowing the air to the outlet, a regenerator assembly for blowing hot air to the desiccant assembly for drying the desiccant assembly, a heat exchanger for condensing high temperature, humid air blown by the regenerator assembly through the desiccant assembly, to separate the moisture from the air, and a water collecting assembly for collecting water condensed and separated from the air at the heat exchanger.

36 Claims, 16 Drawing Sheets

(a)

(b)

DEHUMIDIFIER

TECHNICAL FIELD

The present invention relates to dehumidifiers, and more particularly, to a dehumidifier, in which moisture is adsorbed, not by refrigerant, but by desiccant to collect the moisture separately, for improving dehumidifying efficiency.

BACKGROUND ART

In general, the dehumidifier reduces humidity of a room by drawing humid air from the room, making the humid air to pass through a heat exchanger having a condenser and an evaporator through which refrigerant flows to remove moisture from the air, and discharging the air having the moisture removed therefrom, again.

That is, the dehumidifier takes heat from air around it by vaporizing liquid refrigerant at the evaporator. In more detail, a temperature of the evaporator drops as the refrigerant vaporizes, and as the air passes through the evaporator, a temperature of the air also drops.

As the temperature around the evaporator drops, the moisture in the air condenses, to form dew on a surface of the evaporator.

FIG. 1 illustrates a diagram of a related art dehumidifier.

Referring to FIG. 1, the related art dehumidifier is provided with a cabinet 1 having an inlet (not shown) for drawing room air, a filter 2 mounted on an inlet side, a heat exchanger 3 in front of the filter 2 on the cabinet 1 for heat exchange with the room air to dehumidify the room air, a fan assembly 4 in front of the heat exchanger 3 for forced circulation of the room air, a water tank 6 under the heat exchanger for collecting condensed water, and a front panel 5, a frontal exterior of the dehumidifier, having an outlet 5a.

However, the related art dehumidifier has the following problems.

The outlet 5a in the front panel 5 provides a poor outer appearance, and is difficult to change a direction of discharge of the air.

Since the water tank 6 can be mounted/dismounted through a rear of the cabinet 1, the mounting/dismounting of the water tank 6 is not convenient.

Because the room air passed through the heat exchanger 3 is discharged to the room again directly even if the moisture is not removed from the air fully, the dehumidifying efficiency is poor.

Moreover, the use of the compressor in the related art humidifier for circulation of the refrigerant leads to a production cost high, and causes much noise and vibration during operation.

SUMMARY

Accordingly, the present invention is directed to a dehumidifier that substantially obviates one or more problems due to limitations and disadvantages of the related art.

An object of the present invention is to provide a dehumidifier which has a high dehumidifying efficiency, low cost, and very low noise and vibration.

Another object of the present invention is to provide a dehumidifier which has a good outer appearance, and water tank for holding dehumidified water mounting/dismounting of which is easy.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the dehumidifier includes a case, inlets passed through the case for introduction of air from an outside of the case to an inside of the case, an outlet formed to pass through a top of the case for discharging air dehumidified in the case to the outside of the case, a desiccant assembly for absorbing moisture from air drawn into the case, a blower assembly for drawing air through the inlets and blowing the air to the outlet, a regenerator assembly for blowing hot air to the desiccant assembly for drying the desiccant assembly, a heat exchanger for condensing high temperature, humid air blown by the regenerator assembly through the desiccant assembly, to separate the moisture from the air, and a water collecting assembly for collecting water condensed and separated from the air at the heat exchanger.

In another aspect of the present invention, a dehumidifier includes a case, inlets passed through the case for introduction of air from an outside of the case to an inside of the case, an outlet formed to pass through a top of the case for discharging air dehumidified in the case to the outside of the case, a desiccant assembly including a desiccant member for absorbing moisture from air drawn into the case, a desiccant rotor rotatably mounted for housing the desiccant member, and a rotating unit for rotating the desiccant rotor, a blower assembly for forced drawing of air through the inlets and blowing the air to the outlet, a regenerator assembly including a regenerating fan for blowing air to the desiccant assembly, a regenerating motor for providing a rotating power to rotate the regenerating fan, and a heater for heating the air blown by the regenerating fan, for drying the desiccant assembly, a heat exchanger for condensing high temperature, humid air blown by the regenerator assembly through the desiccant assembly, to separate the moisture from the air, and a water collecting assembly for collecting water condensed and separated from the air at the heat exchanger.

In another aspect of the present invention, a dehumidifier includes a case, inlets passed through the case for introduction of air from an outside of the case to an inside of the case, an outlet formed to pass through a top of the case for discharging air dehumidified in the case to the outside of the case, a desiccant assembly including a desiccant member for absorbing moisture from air drawn into the case, a desiccant rotor rotatably mounted for housing the desiccant member, and a rotating unit for rotating the desiccant rotor, a blower assembly for forced drawing of air through the inlets and blowing the air to the outlet, a regenerator assembly for blowing hot air to the desiccant assembly for drying the desiccant assembly, a heat exchanger for condensing high temperature, humid air blown by the regenerator assembly through the desiccant assembly, to separate the moisture from the air, and a water collecting assembly for collecting water condensed and separated from the air at the heat exchanger, wherein the regenerator assembly includes, a regenerating fan for blowing air toward the desiccant assembly, a regenerating fan housing for housing the regenerating fan, a regenerating motor for providing a rotating power to rotate the regenerating fan, a heater for heating the air blown by the regenerating fan, a heater case for casing the heater, having one side in communication with the regenerating fan housing, and the other side in communication with a portion of the desiccant assembly for guiding air from the regenerating fan to the desiccant member, a regenerating cover for guiding the air passed through the desiccant assembly by the regenerating fan to an inside of the heat exchanger, and a circulating duct for guiding the air passed through the heat exchanger to the regenerating fan.

Thus, the dehumidifier of the present invention draws air room air through a front and a rear of the case, a lower side of a side of the case, or corners of one side of the case, and discharges upward of the case. Accordingly, since there is a room for utilizing the front or the rear of the dehumidifier, an exterior of a design the user desires can be provided.

The provision of the desiccant assembly for keeping absorbing moisture from room air, and the regenerator assembly for keeping drying the desiccant member in the case permits to improve dehumidifying efficiency compared to the related art dehumidifier.

The elimination of a compressor from the related art dehumidifier permits to reduce weight of the dehumidifier, as well as noise of the dehumidifier, to improve convenience of use of the dehumidifier.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings FIGS. 2 to 6. Wherever possible, the same reference numbers will be used throughout the drawings to refer to the same or like parts.

Figure 1:
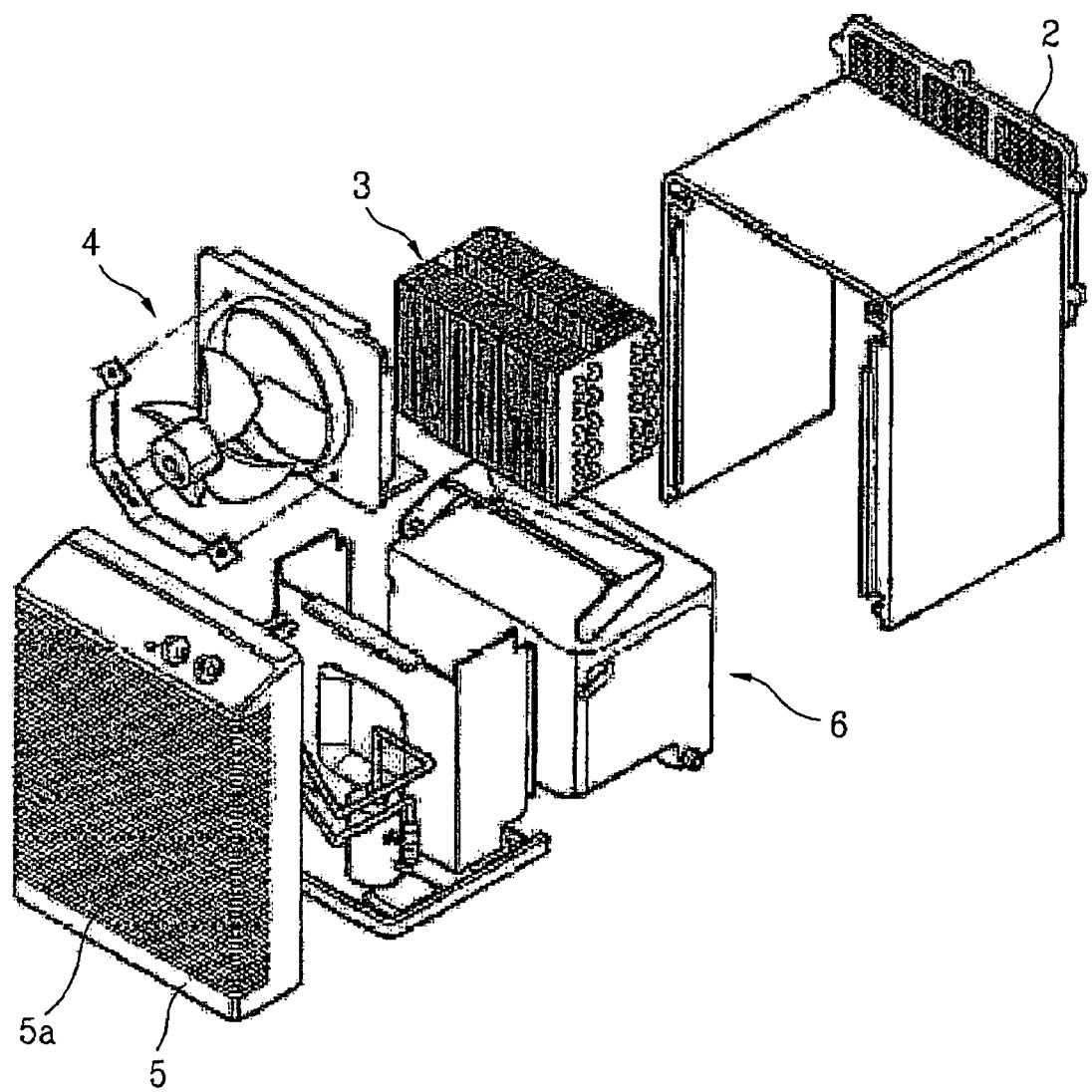
FIG. 1 illustrates an exploded perspective view of a related art dehumidifier.
Figure 2:
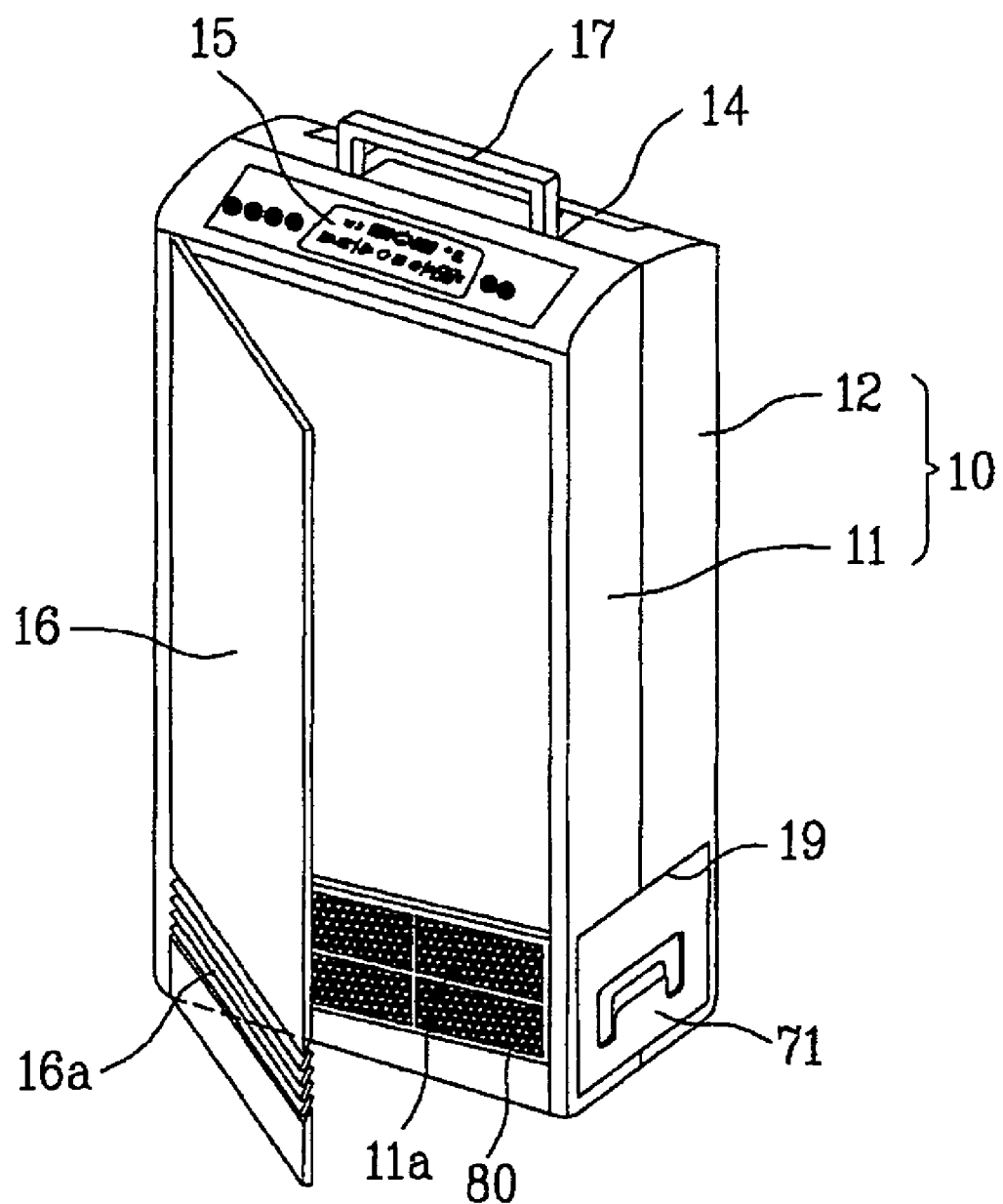
FIG. 2 illustrates a perspective view of a dehumidifier in accordance with a preferred embodiment of the present invention.
Figure 3:
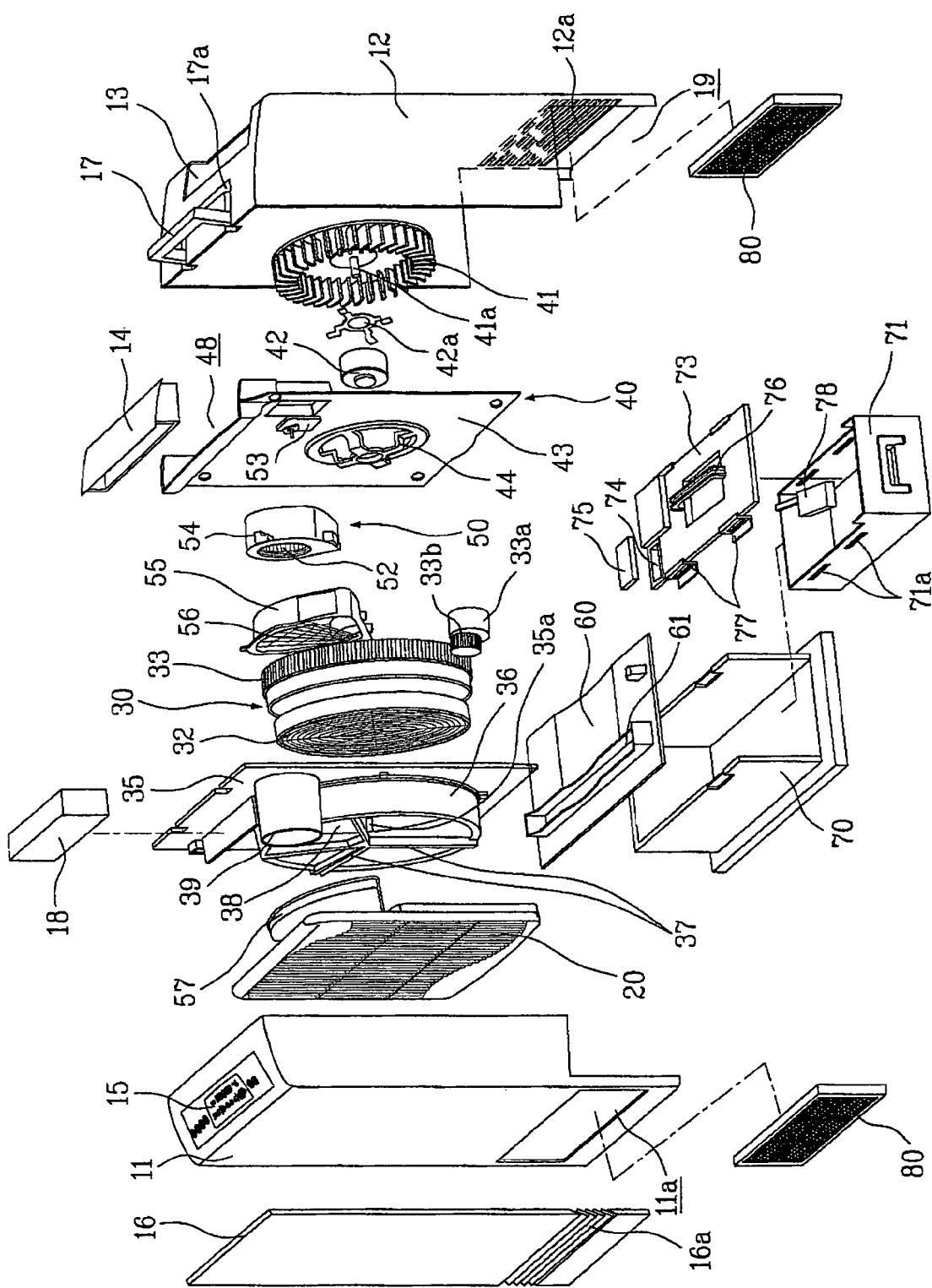
FIG. 3 illustrates an exploded perspective view of the dehumidifier in FIG. 2.

Referring to FIGS. 2 and 3, the dehumidifier includes a case 10 of an exterior of the dehumidifier, a heat exchanger 20 of a heat conductive material in the case 10, a desiccant assembly 30 in the case 10 for absorbing moisture from the air, a blower assembly 40 for forcing the room air to be drawn into the case 10, and a regenerator assembly 50 for forced circulation of a portion of the room air drawn into the case 10 through the heat exchanger 20.

The case 10 has a hexahedral shape substantially, with a front half portion and a rear half portion. That is, the case 10 includes a front frame 11 forming exteriors of a front, sides and a top of a front half of the case 10, and a rear frame 12 forming exteriors of a rear, sides and a top of the rear half of the case 10. The front frame 11 and the rear frame 12 have hexahedral shapes having a rear and a front thereof opened, respectively.

The case 10 having the front frame 11 and the rear frame 12 has inlets 11a, and 12a in the front, rear or sides for drawing the room air. The inlets 11a, and 12a are in a front of the front frame 11 and in a rear of the rear frame 12, respectively.

The inlets 11a and 12a are rectangular substantially, with filters 80 mounted thereon, respectively. The filter 80, for filtering foreign matters from air, may include a single unit selected from a prefilter for filtering relatively large sized dust from the air drawn through the inlets 11a, and 12a, deodoring filters for removing smell, dust collecting filters each for collecting dust by an electrical action, and a HEPA filter for removing fine dust, or an assembly having above various filters combined as one unit.

In front of the front frame 11 having the inlet 11a, there is a front panel 16 for making a front exterior graceful. The front panel 16 has a shape of a rectangular plate with a size the same with the front frame 11, coupled to a side of the front frame 11 with hinges enabling to rotate in a side direction.

In a lower side of the front panel 16, there is a suction grill 16a with a size in correspondence to the inlet 11a in the front frame 11.

On a top of the front frame 11, there is a transparent display part 15 for displaying an operation state of the dehumidifier. Though not shown, there are a plurality of operation buttons on one side of the display part 15 for operating the dehumidifier.

Under the top of the front frame 11 having the display part 15 mounted thereon, there is a control box 18 for controlling the dehumidifier by handling the operation buttons. Though not shown, in the control box 18, there are a plurality of components, such as circuit boards for controlling the operation of the dehumidifier on the whole.

Under the control box 18, there is a heat exchanger 20 for making heat exchange with the room air drawn through the inlet 11a. The heat exchanger 20 has two tiers of different sized heat exchangers having inside passages of a plurality of tubes connected to one another for bringing air circulating by a recycling assembly 20 described later into contact with the room air drawn through the inlet 11a thereby making more heat exchange. One exemplary structure of the heat exchanger 20 will be described with reference to FIGS. 4 and 5, in more detail.

In rear of the heat exchanger 20, there is a regenerating cover 57 in correspondence to the heater case 55 to be described later. The regenerating cover 57 forms a flow passage for guiding the air circulated by the regenerator assembly 50 to the heat exchanger 20, again.

In rear of the regenerating cover 57, there is a desiccant assembly 30 for absorbing moisture from the room air drawn through the inlet 11a. The desiccant assembly 30 includes a desiccant member 32 for absorbing moisture from air, a rotor 33 for rotating the desiccant member 32, a rotor housing 35 for supporting the rotor 33 to rotate, and a motor 33a for providing rotating power to rotate the rotor 33.

The desiccant member 32 has a disk shape constructed of paper, with a plurality of pass through holes like a honeycomb. In more detail, the desiccant member 32 is fabricated by rolling two layers of paper like a honeycomb and bonded together, to form a plurality of the pass through holes, and permeating a desiccant solution therein.

According to this, when the room air passes through the pass through holes in the desiccant member 32, the moisture is absorbed in the desiccant member, to dry the air.

The desiccant member 32 has a disk shape and mounted to the rotor 33. The rotor 33 is a circular frame, and has a gear on an outside circumference. On an outer side of the rotor 33, there is a rotor driving gear 33b rotated by the rotor motor 33a. The rotor driving gear 33b is engaged with the outside circumference of the rotor 33, to rotate the rotor 33.

The rotor motor 33a rotates the rotor 33 slowly (for an example, 1 RPM) so that the desiccant member 32 absorbs moisture from the air passing therethrough.

The rotor 33 is housed in, and supported on the rotor housing 35. The rotor housing 35 has a square plate shape substantially, with an opened center. Around the opened center of the rotor housing 35, the rotor cover 36 is formed as a circular rim projected therefrom. In the rotor cover 36, the rotor 33 is housed.

At a center of the rotor cover 36, there is a rotation shaft 35a which is a rotation center of the rotor 33 supported by a plurality of supporting arms 37 extended from an edge of the rotor cover 36 to the center in a radial direction.

At an upper side of a right side of the rotor housing 35, there is a circulating duct 39 for guiding the air from the heat exchanger 20 to the regenerator assembly 50, and at a lower side of the right side of the rotor housing 35, there is the motor 33a coupled with the rotor driving gear 33b as one unit for providing rotating power to rotate the rotor 33.

In rear of the desiccant assembly 30, as a component of the regenerator assembly 50 to be described later, there is a heater 56 for providing heat to dry the desiccant member 32. The heater 56 has a fan shape substantially, and is encased in a heater case 55 having a front and a portion of a top opened.

Accordingly, since the heater case 55 is mounted matched to a fan shaped regenerative flow passage 38 partitioned at an upper side of the rotor housing 35 by the rotor arms 37, the heater case 55 serves to regenerate a portion of the desiccant member 32 to dry the portion, continuously.

In rear of the heater 56, there is the blower assembly 40 for drawing the room air through the inlet 11a, forcibly. The blower assembly 40 includes a fan 41 for drawing the room air through the inlet 11a, a blower housing 43 for housing, and supporting the fan 41, and a fan motor 42 for providing rotation power to the fan 41.

The blower housing 43 has a square plate shape substantially, with a circular opening at a center, to form a flow passage of the room air drawn by the rotation power of the fan 41. At a top of the blower housing 43, there is a discharge flow passage 48 for discharging the room air drawn by the fan 41 to an outside of the dehumidifier.

At the opened portion of the blower housing 43, there is a motor support 44 for housing a portion of the fan motor 42, and supporting the fan motor 42. Opposite to the motor support 44, there is a motor mount 42a for securing the fan motor 42.

In front of an upper side of the blower assembly 40, there is the regenerator assembly 50 for passing a portion of the room air drawn through the inlet 11a through the case 10.

The regenerator assembly 50 includes a regenerating fan 52, a regenerating fan housing 54 for housing and supporting the regenerating fan 52, a regenerating motor 53 for providing a rotating power to rotate the regenerating fan 52, a heater 56 for providing heat to dry the desiccant member 32, and a heater case 55 for casing the heater 56. The regenerating fan 52 may be a centrifugal type fan, such as a sirocco fan, but a variety of types of fans may be used.

The regenerating fan housing 54 has a disk shape substantially for mounting the regenerating fan 52 therein. The regenerating fan housing 54 has a suction opening at a center in communication with the circulating duct 39, and an outlet at one side of underside in communication with the heater case 55.

Therefore, when the regenerating fan 52 rotates, the air is drawn forcibly into the regenerating fan housing 54 through the circulating duct 39, and discharged to the heater case 55.

That is, the regenerating fan housing 54 guides the air from the regenerating fan 52 to the heater 56 and the regenerating flow passage 38, to keep drying a portion of the desiccant member 32 rotating at a position opposite thereto.

In the meantime, there is a drain pan 60 under the heat exchanger 20 for collecting condensed water from the heat exchanger 20 and guiding to a water tank 71. The drain pan 60 is rectangular substantially, with a drain groove projected upward for guiding condensed water from the heat exchanger 20 to the water tank 71.

Under the drain pan 60, there is a base pan 70 for mounting the front frame 11 and the rear frame 12 at opposite sides and supporting the heat exchanger 20, the desiccant assembly 30, the blower assembly 40, and so on. The base pan 70 has a hexahedral shape with opened top and one side. The water tank 71 is slidably mounted therein in a lateral direction.

The water tank 71 has a hexahedral box shape having an opened top. On top of the water tank 71, there is a water tank cover 73 detachably mounted thereon for opening/closing the opened top of the water tank 71. On opposite sides of the water tank cover 73, there are a plurality of water tank cover fasteners 77 for hooking with fastening projections 71a at upper sides of opposite sides of the water tank 71, respectively.

It is preferable that there is a water tank handle 76 at a center of a top of the water tank cover 73 for easy handling of the water tank 71. On one side of the water tank handle 76, there is a water tank inlet 74 in communication with a bottom of the drain groove 61 for guiding the water to the water tank 71.

On the water tank inlet 71, there is an inlet cover 75 for preventing water from flowing out of the water tank 71 at the time the water tank 71 in in/out.

In the water tank 71, there is a float 78 for moving up/down along a water level changing as the water is collected in the water tank 71 to sense full of water tank. Through not shown, the float 78 is connected to a sensor so that the full of water tank 71 can be displayed so as to be noticeable from an outside of the water tank 71.

In the meantime, the rear frame 12 of the dehumidifier which is a rear exterior of the dehumidifier has a size in correspondence to the front frame 11, and is coupled to the front frame 11 on the base pan 70, to form the case 10.

In a top surface of the rear frame 12, there is an outlet 13 for guiding the air dehumidified as the air is drawn through the inlets 11a, and 12a and flows through the inside of the case 10 to be discharged to the room again.

Under the outlet 13, there is a discharge louver 14 for controlling a direction of air discharged toward the outlet 13. Though not shown, the discharge louver 14 may be mounted to open the outlet 13 as the louver rotates in an up/down direction at the outlet 13 by a driving unit, such as a step motor, or to slide in an up/down direction by other driving unit.

According to this, when the dehumidifier is not in operation, the discharge louver 14 rotates to an inside of the outlet 13, or slides down, to close the outlet 13, and when the dehumidifier is in operation, the discharge louver 14 rotates to an outside of the outlet 13, or slides up, to open the outlet 13, to control a direction of the dehumidified air discharged from the outlet 13.

On a top of the rear frame 12, i.e., in front of the outlet 13, there is a handle 17 for easy movement of the dehumidifier. The handle 17 has opposite ends hinged on the top of the rear frame 12, enabling the handle 17 to move in a up/down direction, and, under the handle 17, there is a handle groove 17a for seating the handle 17 when the handle 17 is not in use.

There is a water tank opening 19 in a lower side of a side of the rear frame 12 and a lower side of a side of the front frame 11 for drawing the water tank 71 out of the dehumidifier.

Figure 4:
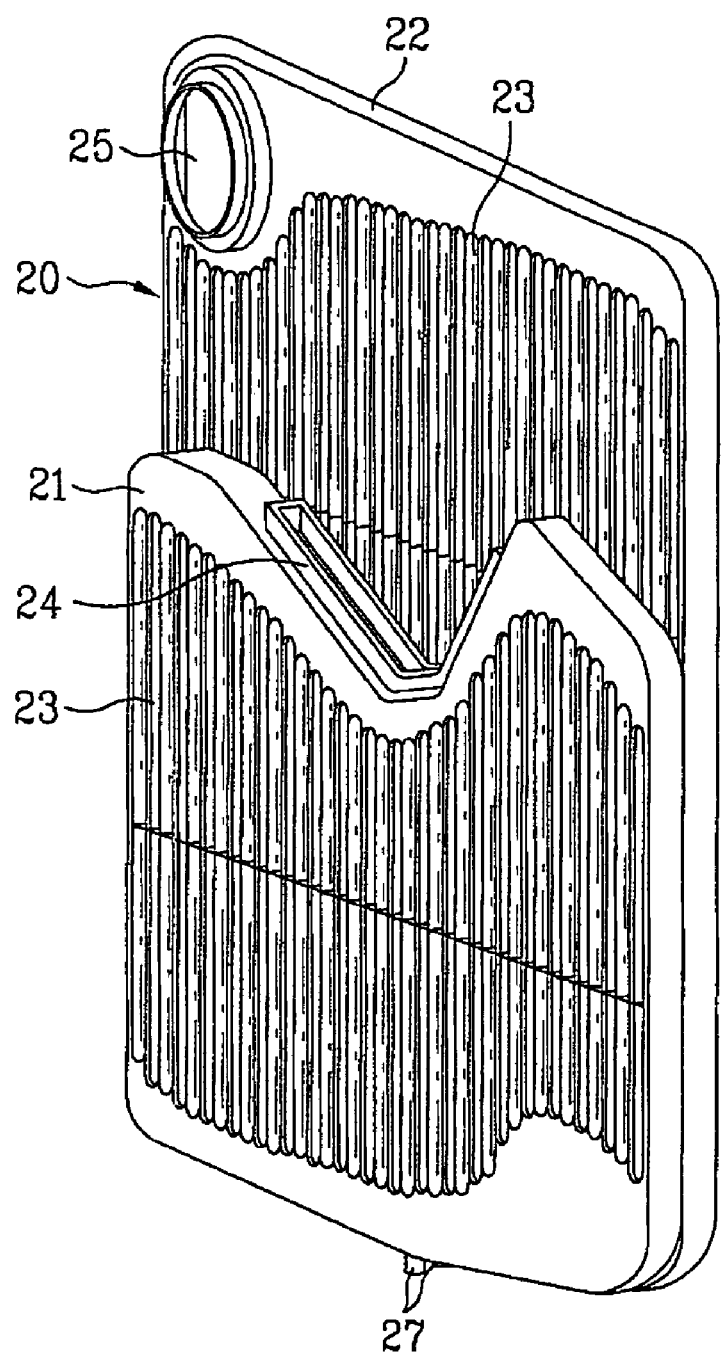
FIG. 4 illustrates a perspective view of a heat exchanger in FIG. 3.
Figure 5:
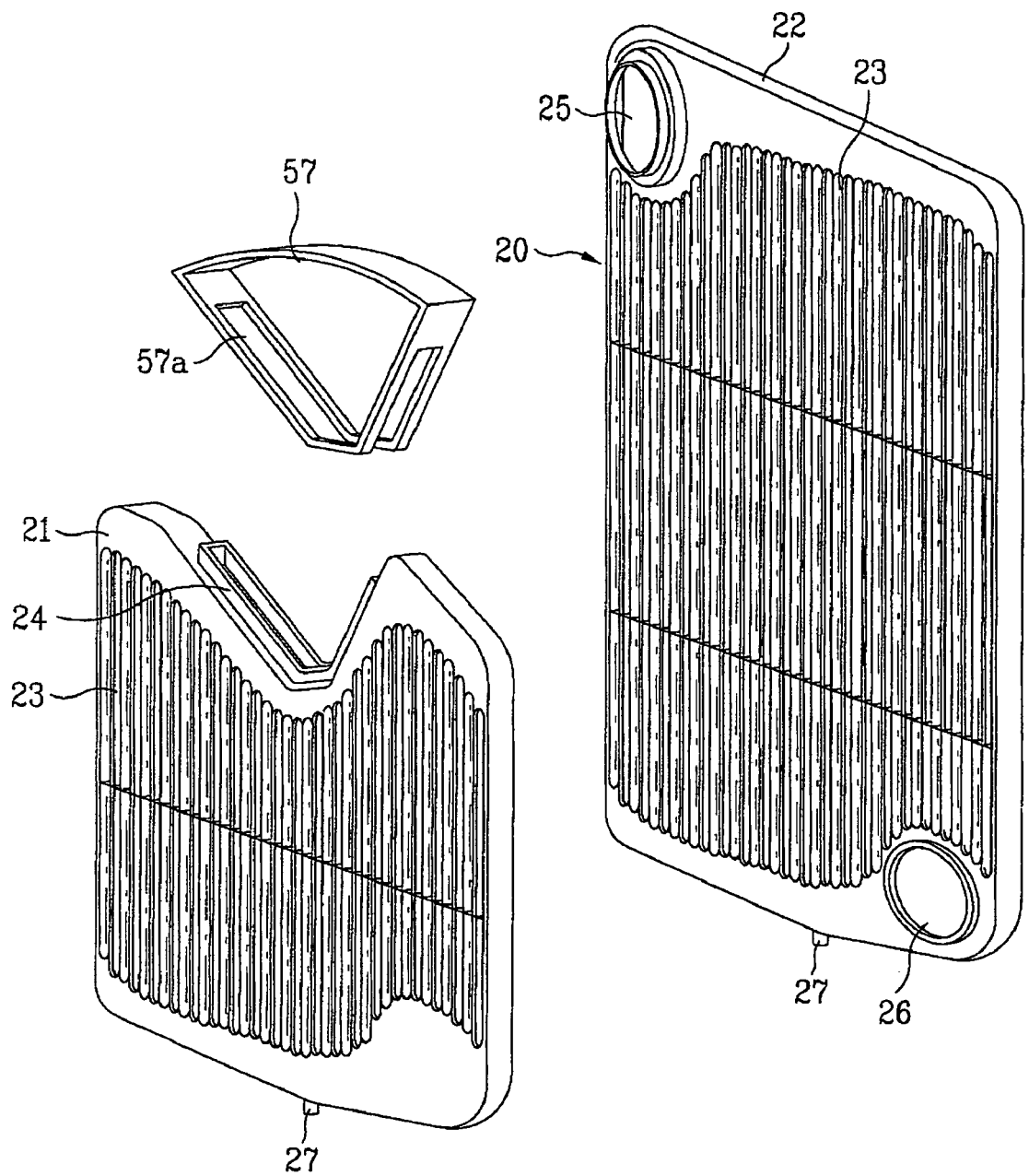
FIG. 5 illustrates a perspective view of the heat exchanger of the dehumidifier in FIG. 4.

In the meantime, referring to FIGS. 4 and 5, the heat exchanger 20 includes a first heat exchanger 21 and a second heat exchanger 22 larger than the first heat exchanger 21. The first, and second heat exchangers 21, and 22 have a plurality of tubes in communication with one another, for enabling an air flow therein. It is preferable that the tubes 23 of the first and second heat exchangers are arranged at regular intervals, and is constructed such that the air can flow freely between the tubes 23.

In a top of the first heat exchanger 21, there is an induction hole 24 for introducing the air guided through the regenerating cover 57 into the first heat exchanger 21. In one side of the lower side of each of the first, and second heat exchangers 21, and 22, there is a connecting hole 26 for making the first, and second heat exchangers 21, and 22 in communication.

In one side of a top side of the second heat exchanger 22, there is a discharge hole 25 for discharging air from the second heat exchanger 22.

At a bottom of each of the first, and second heat exchangers 21, and 22, there is a drain hole 27 for draining condensed water from the heat exchanger 20.

It is preferable that the regenerating cover 57 has a size and a shape matched to the regenerating flow passage 38. In a lower side of the regenerating cover 57, there is a guide hole 57a formed in conformity with, and in communication with, the induction hole 24.

Therefore, the air blowing through the regenerating flow passage 38 is introduced into the first heat exchanger 21 through the guide hole 57a in the regenerating cover 57, and the induction hole 24 in the first heat exchanger 21, and therefrom into the second heat exchanger 22 through the connecting holes 26, flows through the second heat exchanger 32, and discharged to the circulating duct 39 through the discharge hole 25.

Figure 6:
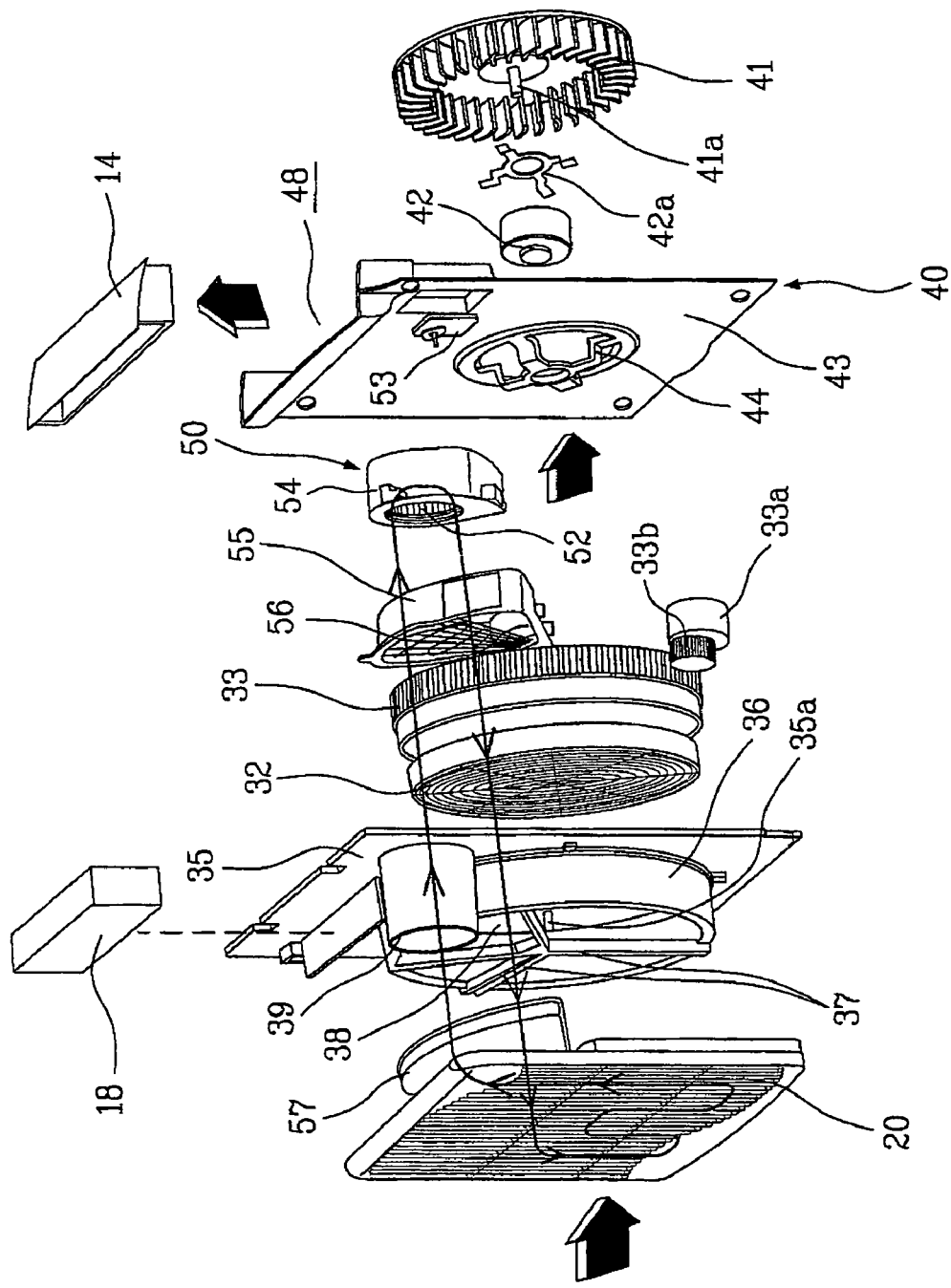
FIG. 6 illustrates a diagram showing operation of the dehumidifier in FIG. 2.

The operation of the dehumidifier of the present invention will be described in detail with reference to FIG. 6.

As indicated with large arrows, when humid room air is drawn into the case 10 through the inlets 11a, and 12a by the rotating power of the fan 41, the air has foreign matters removed therefrom as the air passes through the filter 80, and passes through the desiccant assembly 30 through the heat exchanger 20.

In this instance, the air has moisture removed therefrom as the air passes through the pass through holes in the desiccant member 32, and is discharged to the room through the outlet 13 by the rotating power of the fan 41 as the air passes through the blower assembly 40.

Next, as indicated with small arrows, in a regenerating process for drying the desiccant member 32 of the desiccant assembly 30 continuously, the air blown forcibly by the rotation of the regenerating fan 52 passes through the heater 60 through the heater case 55, and is heated to warm air such that the warm air evaporates moisture absorbed in the desiccant member 32.

The high temperature, humid air passed through the desiccant member 32 moves toward the heat exchanger 20 through the regenerating flow passage 38, and introduced into the regenerating cover 57. Then, the high temperature, humid air circulates through an inside of the heat exchanger 20, and has moisture therein condensed as the high temperature, humid air heat exchanges with the room air having a relatively low temperature drawn through the inlets 11a, and 12a in the circulating process. The condensed water is drained to the drain groove 61 through the drain hole 27 at the bottom of each of the heat exchangers.

The water condensed at the heat exchanger 20 thus is guided to the drain pan 60, and held in the water tank 71, and the air passed through the heat exchanger 20 repeats circulation in which the air is guided to the regenerating flow passage 38 through the rotor housing 35 and the circulating duct 39 again by the regenerating fan 52, to repeat the regenerating process of drying the desiccant member 32, continuously.

Thus, the dehumidifier of the present invention removes moisture from the room air by means of two streams of air flow. That is, the room air drawn by the fan 41 passes through, and has moisture therein absorbed at, the desiccant member 32, and is discharged to an outside of the dehumidifier through the outlet 13.

At the same time with this, while the dehumidifier makes the high temperature air to flow through the regenerative flow passage 38 by the regenerating fan 52, the dehumidifier separates the moisture from a portion of the desiccant member again and blows toward the heat exchanger 20, to condense, and remove the moisture from the air, at the heat exchanger 20, and circulates the air by the regenerating fan 52.

Figure 7:
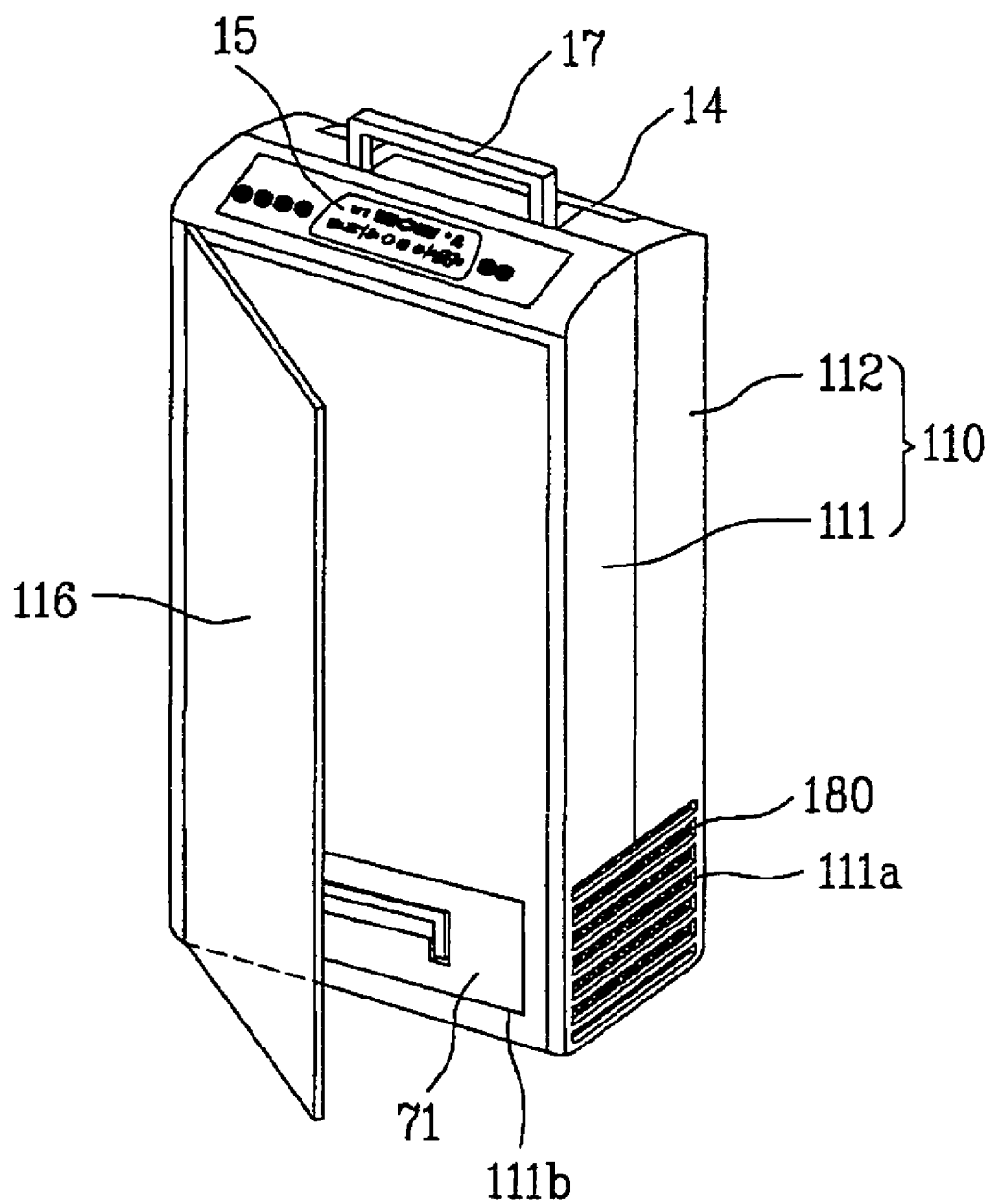
FIG. 7 illustrates a perspective view of a variation of the dehumidifier in FIG. 2.
Figure 8:
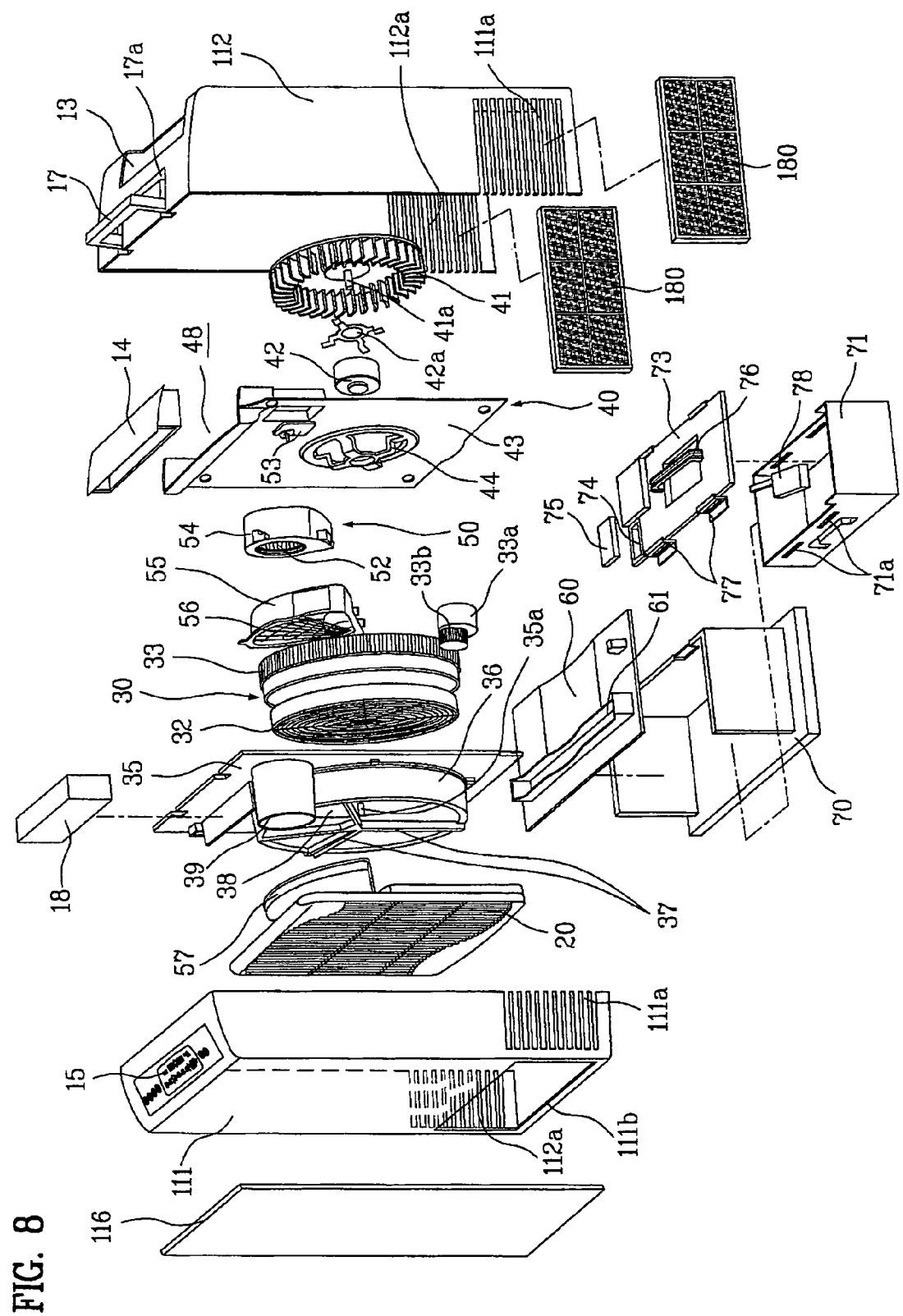
FIG. 8 illustrates an exploded perspective view of the dehumidifier in FIG. 7.

In the meantime, FIGS. 7 and 8 each illustrates another embodiment of the dehumidifier, of which basic system is identical to the foregoing dehumidifier, except that the another embodiment is different form the foregoing embodiment in that the dehumidifier of the another embodiment includes inlets 111a, and 112a in opposite sides of the front frame 111 and the rear frame 112 of the case 110 for drawing air, together with filters 180, and a water tank opening 111b in the front of the front frame 111.

Therefore, the dehumidifier of another embodiment draws through the opposite sides of the case 110 by the fan 41. Moreover, when the water tank 71 is taken out of the dehumidifier after the dehumidification is finished, the user opens the front panel 116, and pulls out the water tank 71 from the case 110.

Since the dehumidifier of another embodiment has the inlets 111a, and 112a in opposite sides of the dehumidifier, no suction grill is required at the front panel 116 for pass through of the air.

Next, a dehumidifier in accordance with another preferred embodiment of the present invention will be described with reference to FIGS. 9 to 13.

The dehumidifier of the embodiment includes a case 210, a heat exchanger 20, a desiccant assembly 50, a blower assembly 40, and a regenerator assembly 50. The heat exchanger 20, the desiccant assembly 50, the blower assembly 40, and the regenerator assembly 50 are identical to the foregoing embodiment, of which detailed description will be omitted.

The case 210 is substantially hexahedral, and has individual sides. That is, the case 210 has a front frame 211 of a front exterior thereof, a rear frame 212 of a rear exterior thereof, two side panels 213a, and 213b of side exterior thereof, and a top panel 214 of a top exterior thereof, and a base pan 270 at a bottom thereof, which are formed individually.

That is, the case 210 is formed as the front frame 211 and the rear frame 212 are mounted at a front and a rear of the base pan 270, and the side panels 213a, and 213b are mounted at sides of the base pan 270, and the top panel 214 is mounted to a top.

The front frame 211, the rear frame 212, and the side frames 213a, and 213b are coupled together with predetermined gaps therebetween to form inlets 211a and 212a for drawing the room air into the case 100.

In more detail, the gaps between a left edge and a right edge of each of the front frame 211 and the rear frame 120 and a front edge and a rear edge of each of the side panels 213a and 213b respectively form the inlets 211a, and 212a.

Insides of the side panels 213a and 213b having the inlets 211a and 212a, there are filters 280 for cleaning room air. The filter 280 is placed in and pulled out of the case 210 through a filter insertion slot 211b extended in an up/down direction in the front frame 211.

The filter 280, for filtering foreign matters from air, may include a single unit selected from a prefilter for filtering relatively large sized dust from the air drawn through the inlets 211a, and 212a, deodoring filters for removing smell, dust collecting filters each for collecting dust by an electrical action, and an HEPA filter for removing fine dust, or an assembly having above various filters combined as one unit.

At a side panel 213b opposite to the side panel 213a having the inlets 211a and 212a formed therein, a water holding amount indicating portion 213c is formed for indicating a water holding amount of the water tank 271 to be described later. The water holding amount indicating portion 213c extends in an up/down direction at middle of the side panel 213b, and is transparent so that the water holding amount of the water tank 271 can be visible from an outside of the dehumidifier.

In front of the front frame 211, there is a front panel 216 for making a front exterior beautiful. The front panel 216 has a size and a shape corresponding to the front frame 211, and is coupled to the front frame 211 at a side edge thereof with hinges for rotation in a lateral direction.

The front panel 216 has a fastening member 216a at a side edge for fastening/unfastening the front panel 216 to/from the front frame 211. The fastening member 216a may be a hook or a magnet.

Figure 13:
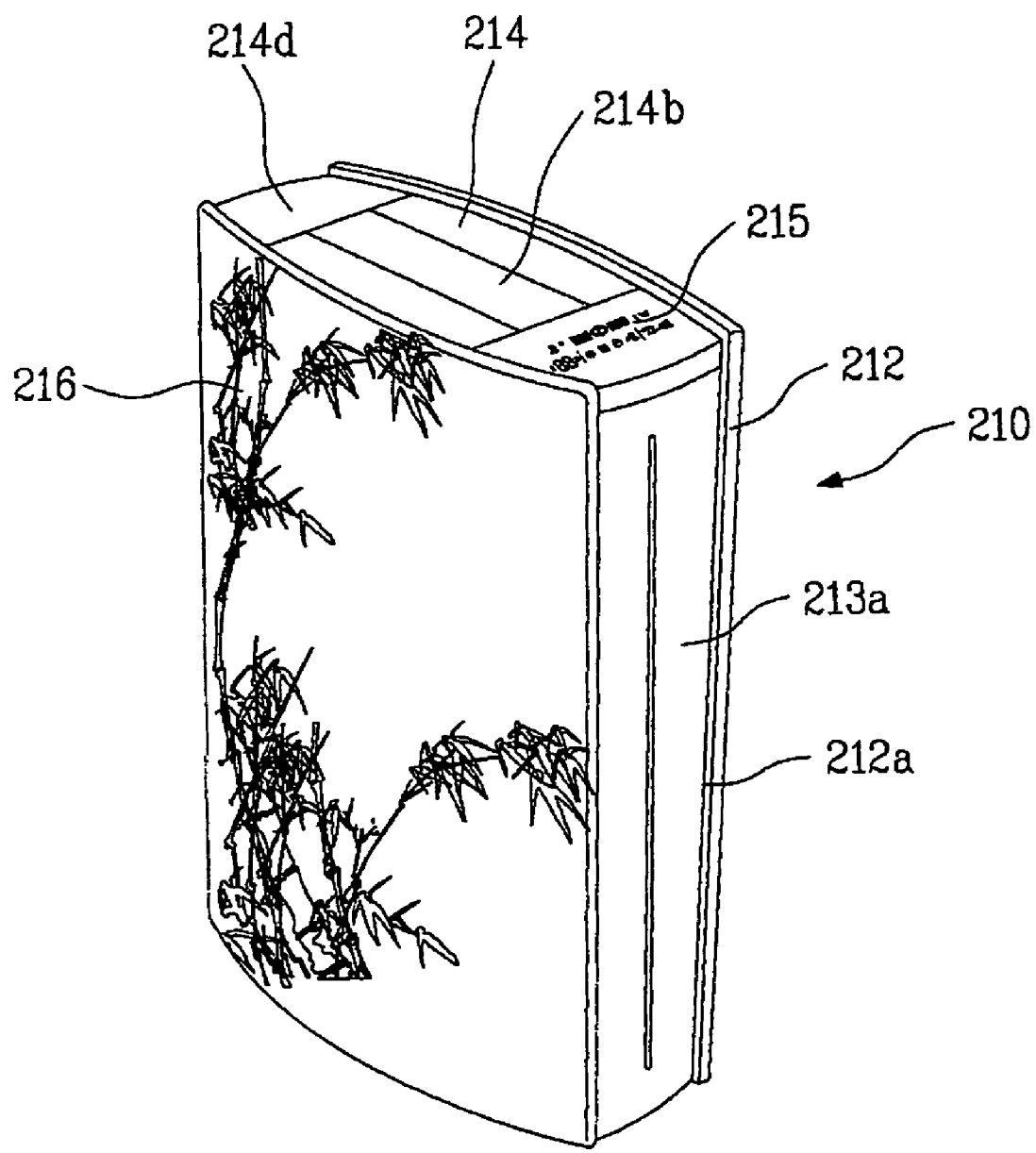
FIG. 13 illustrates a perspective view of a variation of the dehumidifier in FIG. 9.
Figure 14:
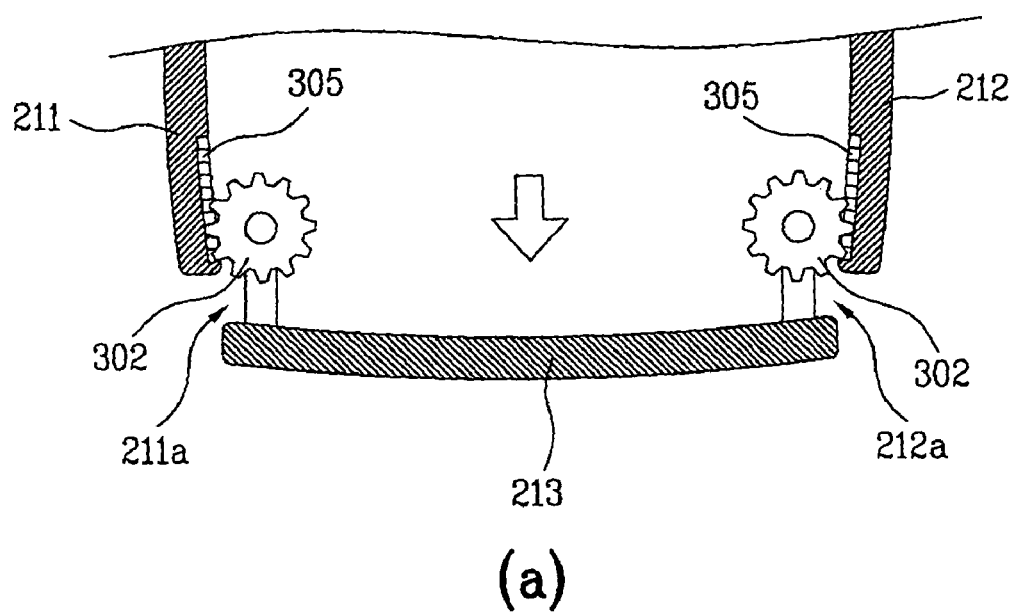
FIG. 14 illustrates sectional views of the dehumidifier in FIG. 13.
Figure 14:
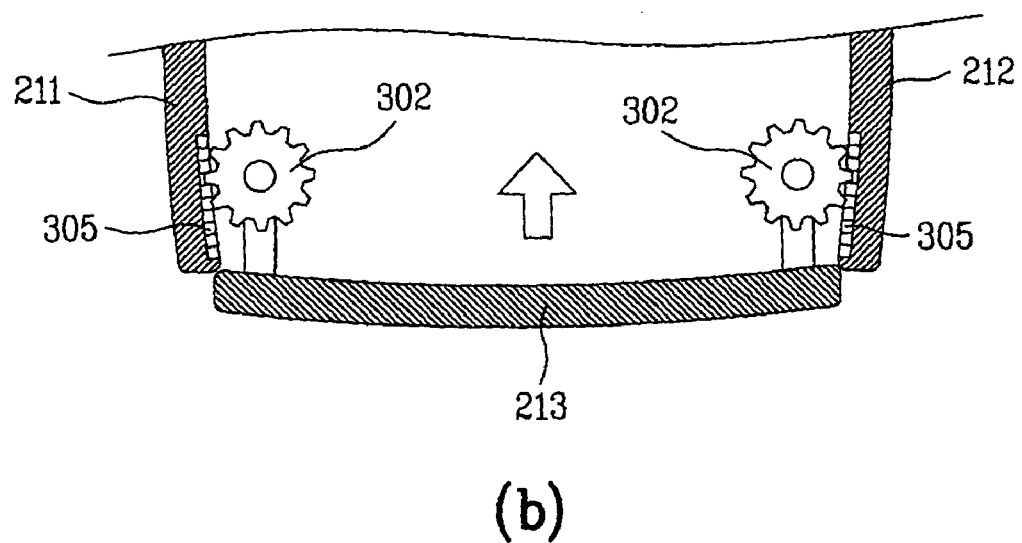
Figure 15:
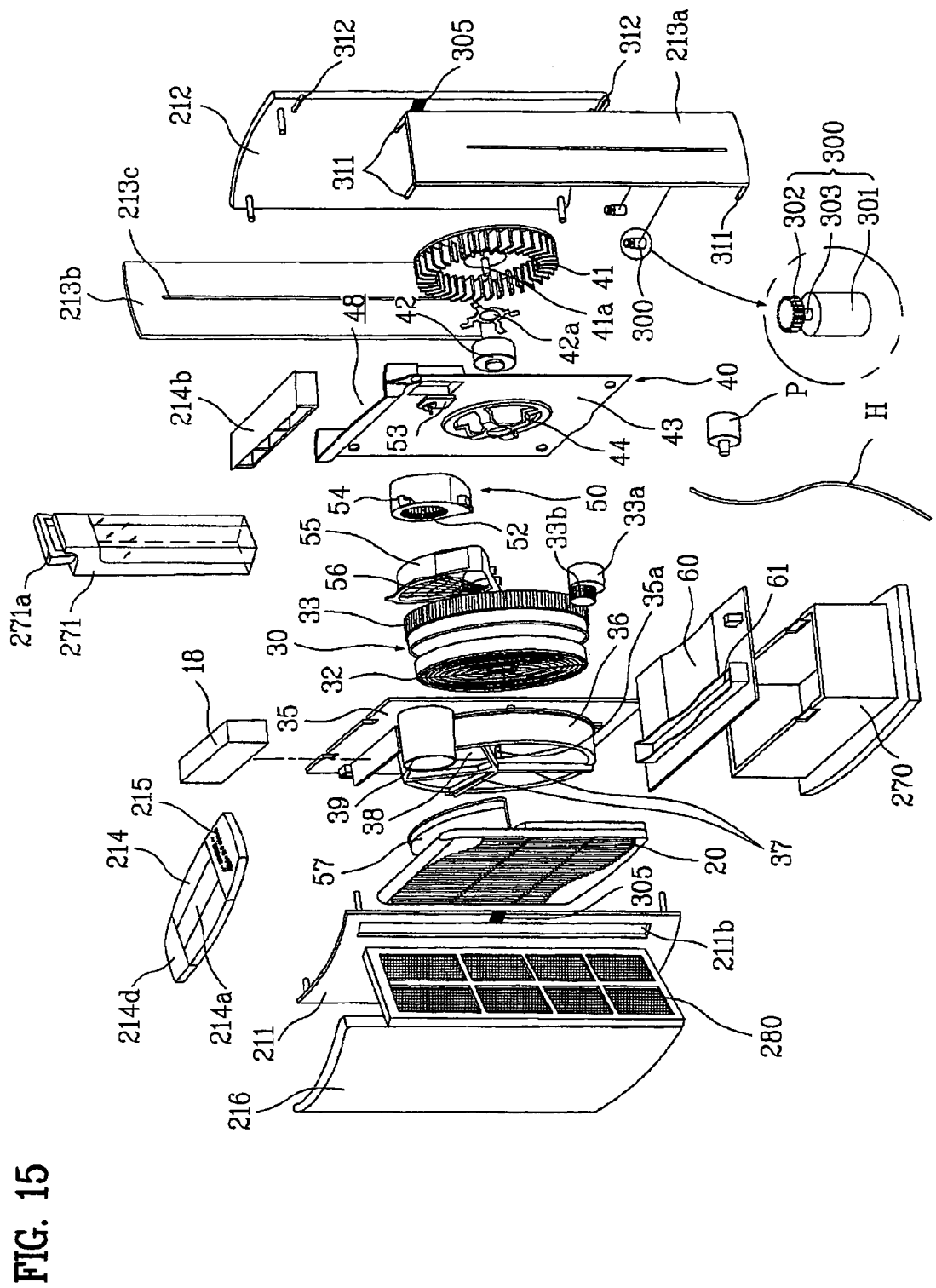
FIG. 15 illustrates an exploded perspective view of the dehumidifier in FIG. 13.

Referring to FIG. 13, on the front of the front panel 216, there may be various patterns or photographs attached thereto for decorating the exterior beautiful.

Accordingly, by making the front panel 216 to be rotatable in the lateral direction, the front panel 216, not only enables easy replacement of the filter 280, but also makes the front exterior of the dehumidifier beautiful.

The top panel 214 is rectangular substantially, and has one side provided with a display unit 215 for displaying an operation state of the dehumidifier, and the other side provided with a water tank opening 214c.

Though not shown, on one side of the display unit 215, there is a plurality of operation buttons for operating the dehumidifier, and a water tank opening cover 214d for closing the water tank opening 214c.

In the middle of the top panel between the display unit 215 and the water tank opening 214c, there is an outlet 214a for discharging dehumidifier air. Alike the foregoing embodiment, the outlet 214a is opened/closed by a discharge louver 214b. The discharge louver 214b may open/close the outlet 214 as the discharge louver 214b is moved by a driving unit such as a step motor, or different from this, by sliding.

In the meantime, on one side of an inside of the case 210, i.e., at an inside of the side panel 213b opposite to the side panel having the inlets 211a and 212a formed therein, there is the water tank 271 for holding condensed water from the heat exchanger 20. The water tank 271 can be drawn upward through the water tank opening 214c in the top panel 24. preferably, on top of the water tank 271, there is a handle 271a for the user to hold the water tank 271 with a hand and draw the water tank 271 easily.

The base pan 270 is a box having all sides enclosed except a top side for collecting the water held in the water tank 271. In order to pump up the water held in the base pan 270 to the water tank 271, a pump P is mounted on the base pan 270, and a hose H is connected to the pump P and the water tank 271 for guiding the pumped water to the water tank 271. Of course, different from this, the hose H and the pump P may be connected to the heat exchanger 20 and the water tank 271 directly, for pumping the condensed water from the heat exchanger 20 to the water tank 271 directly without passing through the base pan 270.

The operation of the dehumidifier will be described.

Upon putting the dehumidifier into operation by operating operation buttons (not shown) on the top panel 214, the fan 41 rotates to draw room air through the inlets 211a and 212a in the side panel 213a. The air has moisture therein removed therefrom as the air passes through the desiccant member 32 via the heat exchanger 20, and is discharged upward through the discharge louver 214b in the outlet 214a.

In this instance, as the air circulates through the regenerative flow passage 38, the heat exchanger 20, and the circulating duct 39 by the regenerator assembly 50, a portion of moisture is removed from the desiccant member 32.

During this regenerating process, the condensed water from the heat exchanger 20 is collected in the base pan 270 guided by the drain pan 60. Then, the water is guided to the water tank 271 along the hose H by the pump P, and held therein.

The user looks at the water holding amount indicating portion 213c on the side panel 213b from an outside of the dehumidifier with naked eyes, to notice an amount of water held in the water tank 271.

When the user intends to empty the water tank 271, the user rotates the water tank opening cover 214d, to open the water tank opening 214c, holds the handle 271a on the water tank 271, and pulls the water tank 271 upward, and empties the water tank 271.

Figure 9:
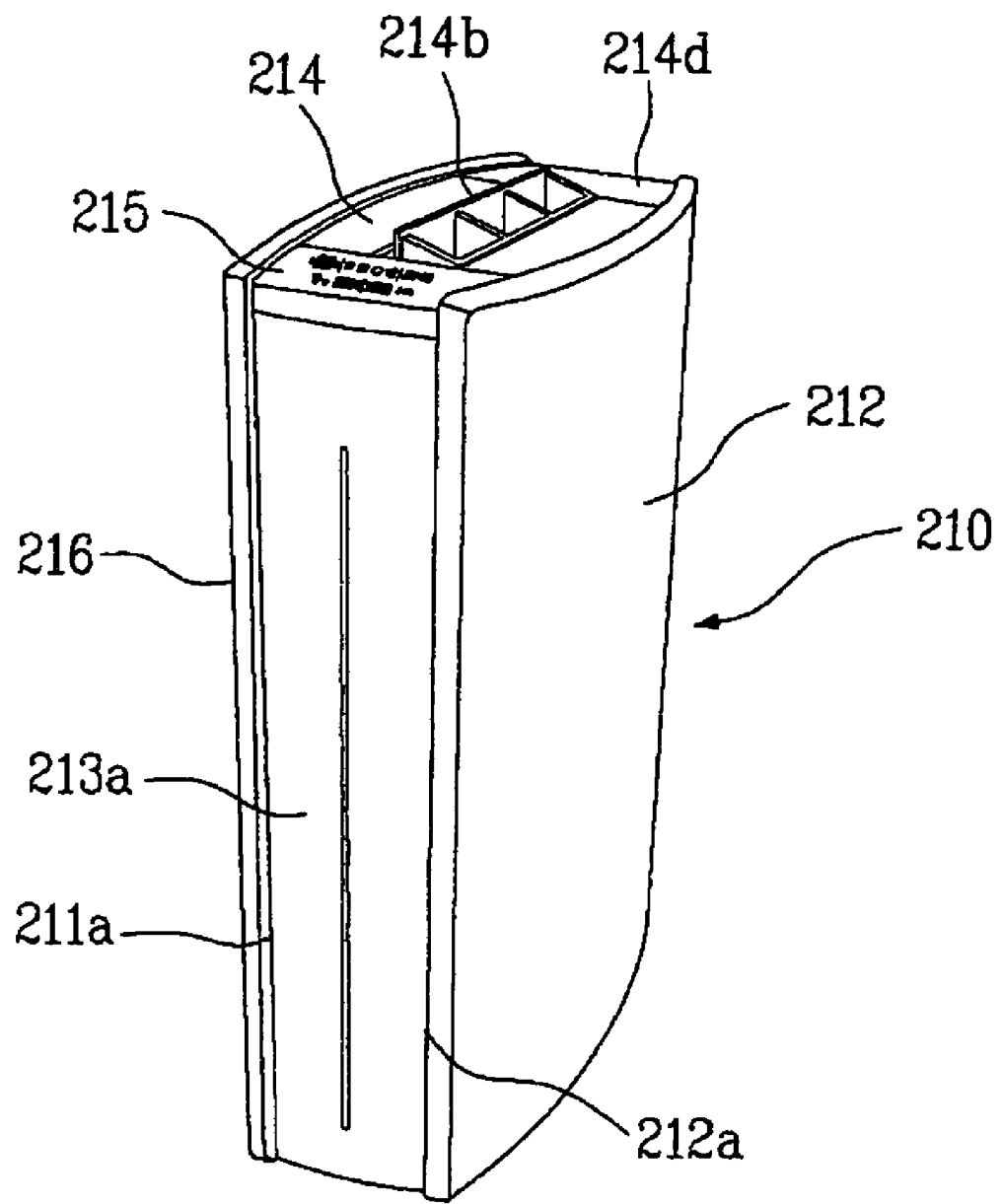
FIG. 9 illustrates a perspective view of a dehumidifier in accordance with another preferred embodiment of the present invention.
Figure 10:
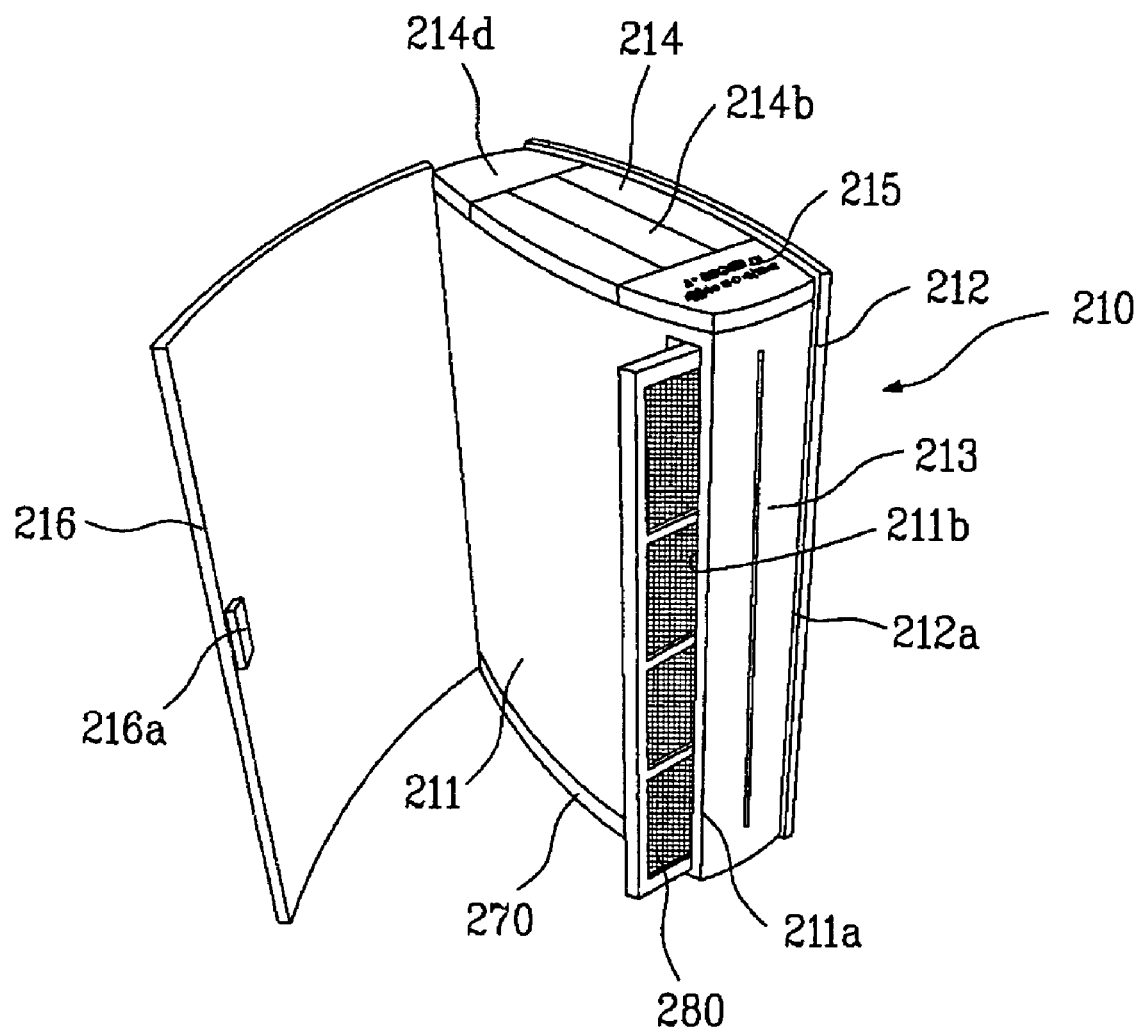
FIG. 10 illustrates a perspective view of the dehumidifier in FIG. 9 with a front panel thereof opened.
Figure 11:
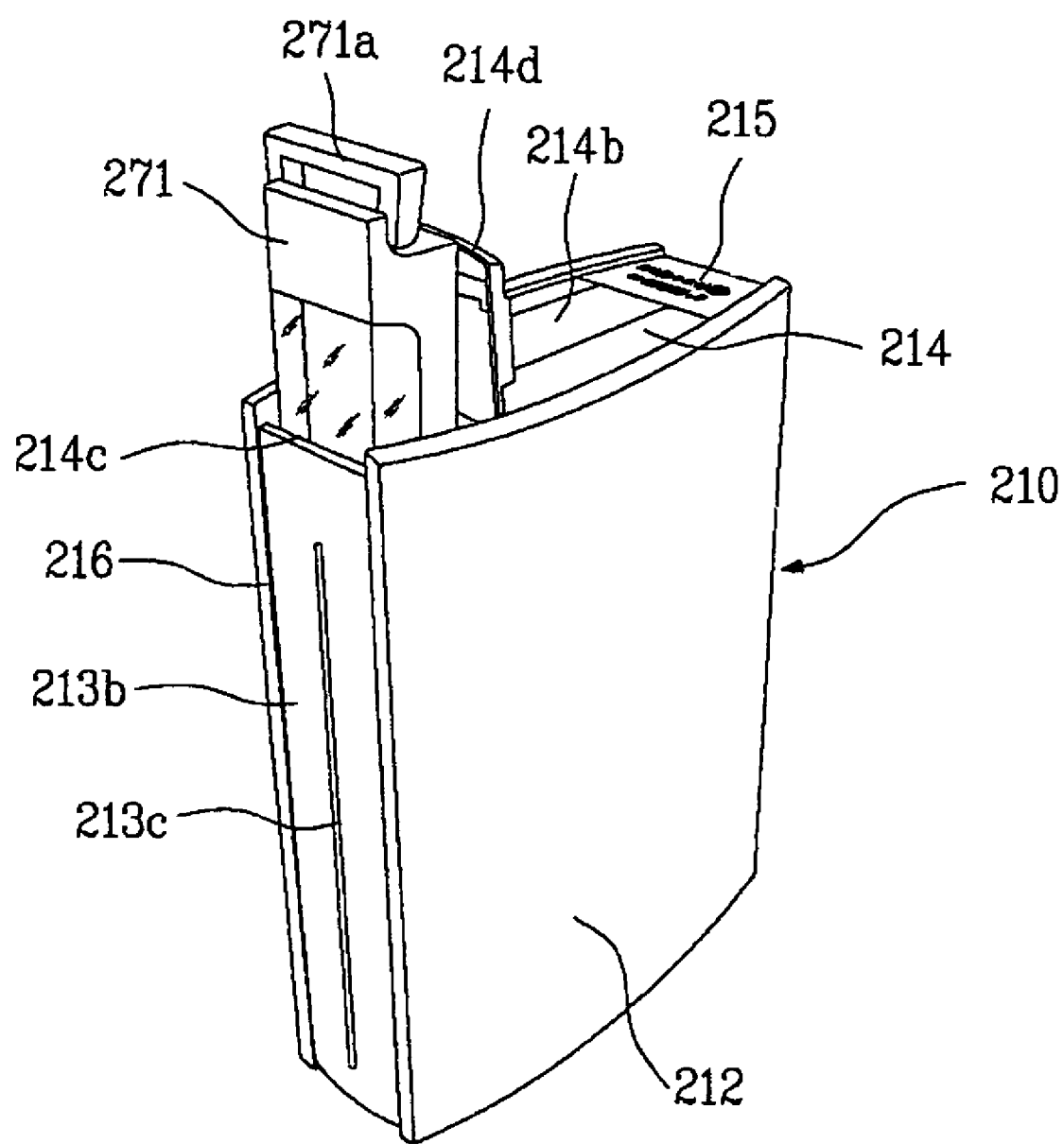
FIG. 11 illustrates a perspective view of the dehumidifier in FIG. 9 with a water tank thereof drawn out partially.
Figure 12:
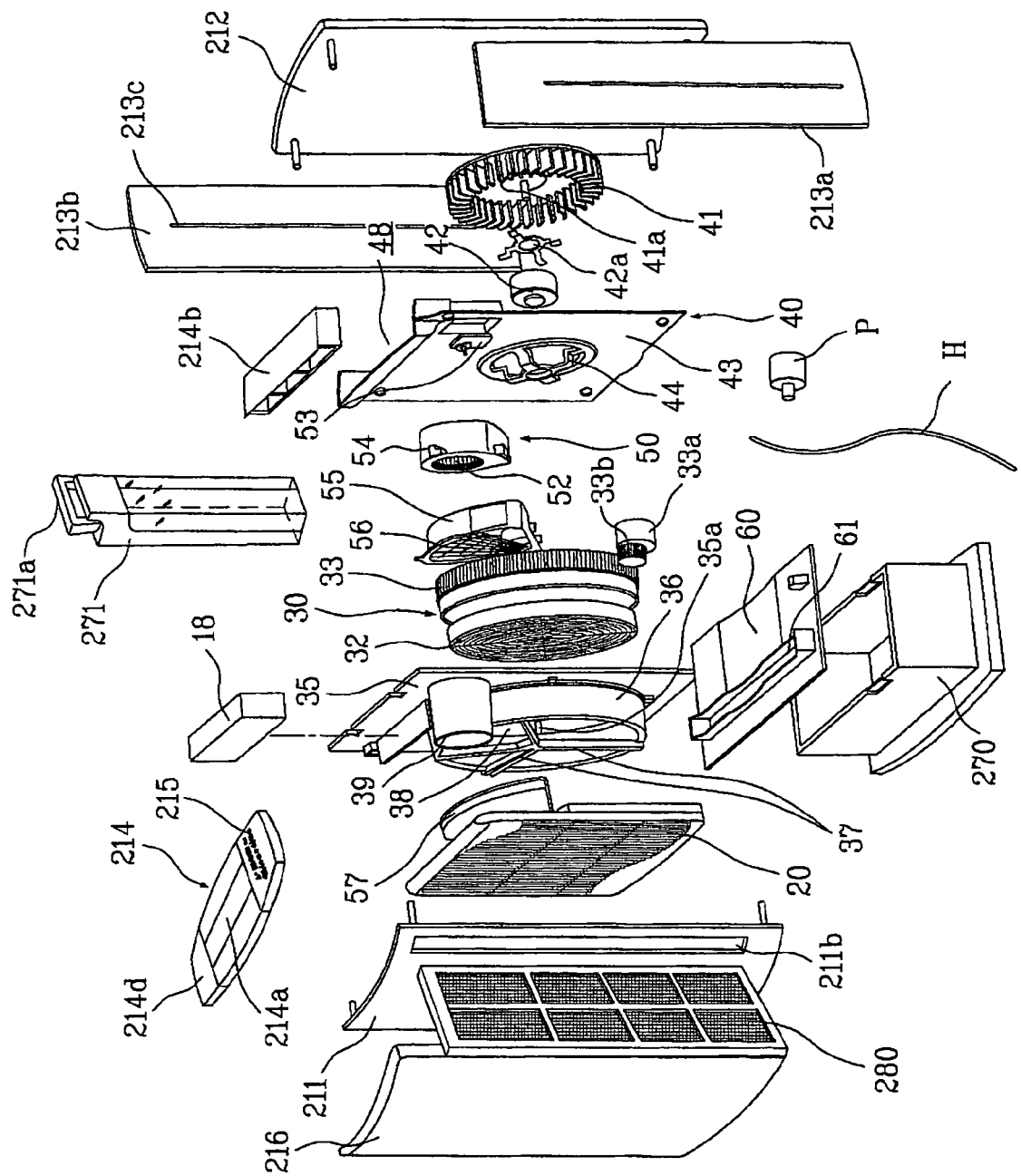
FIG. 12 illustrates an exploded perspective view of the dehumidifier in FIG. 9.

FIGS. 12 to 15 illustrate a variation of the embodiment of the dehumidifier in FIG. 9. The dehumidifier in accordance with the embodiment has one 213a of side panels 213a and 213b of the dehumidifier to move in a lateral direction to open/close the inlets 211a and 212a.

For this, the side panel 130 has a driving unit 300 mounted on each of opposite edges of the side panel 130 for moving the side panel 213a. The driving unit 300 includes a panel driving motor 301 fixedly secured to the side panel 130, and a pinion gear 302 connected to one end of a rotating shaft 303 of the panel driving motor 301.

At inside edges of the front frame 211 and the rear frame 212, there are rack gears 305 extended in a lateral direction for engagement with the pinion gears respectively.

Therefore, when the pinion gear 302 is rotated by the panel driving motor 301, the pinion gear 302 is moved along the rack gear 305. According to this, the side panel 213a moves in a lateral direction.

There are guide bars 311 extended to an inner side of the case 210 from respective corners of the side panel 213a for guiding movement of the side panel 213a. There are guide grooves 312 in an upper side and a lower side of each of the front frame 211 and the rear frame 212 for placing and guiding the guide bars 311.

Therefore, when the side panel 213a moves in a lateral direction to an inside or an outside of the case 210 by actions of the driving units 300 and the rack gears 305, the guide bars 311 move along the guide grooves 312, enabling the side panel 213a to move smoothly along an exact path.

The dehumidifier of the embodiment opens/closes the inlets 211a and 212a by moving the side panel 213a in the lateral direction.

That is, referring to FIG. 14A, when the dehumidifier is put into operation, the pinion gears 302 of the driving units 300 rotate in one direction, to move the side panel 213a toward an outer side of the case 210 in a lateral direction, to open the inlets 211a and 212a between the front frame 211 and the rear frame 212, and the side panel 213a, accordingly.

Opposite to this, referring to FIG. 14B, when operation of the dehumidifier is stopped, the pinion gears 302 of the driving units 300 rotate in a direction opposite to above, to move the side panel 213 toward an inner side of the case 210 in a lateral direction, to close the inlets 211a and 212a, thereby closing inflow of the air.

On the other hand, though the embodiment has been described with reference to a dehumidifier having the driving units mounted on the side panel 213a and the rack gears 305 mounted on the front frame 211 and the rear frame 212, opposite to this, the driving units may be mounted on the front frame 211 and/or the rear frame 212, and the rack gears may be mounted on the side panel 213a.

Of course, the side panel may be moved in the lateral direction by using known driving devices other than the foregoing rack and pinion.

Figure 16:
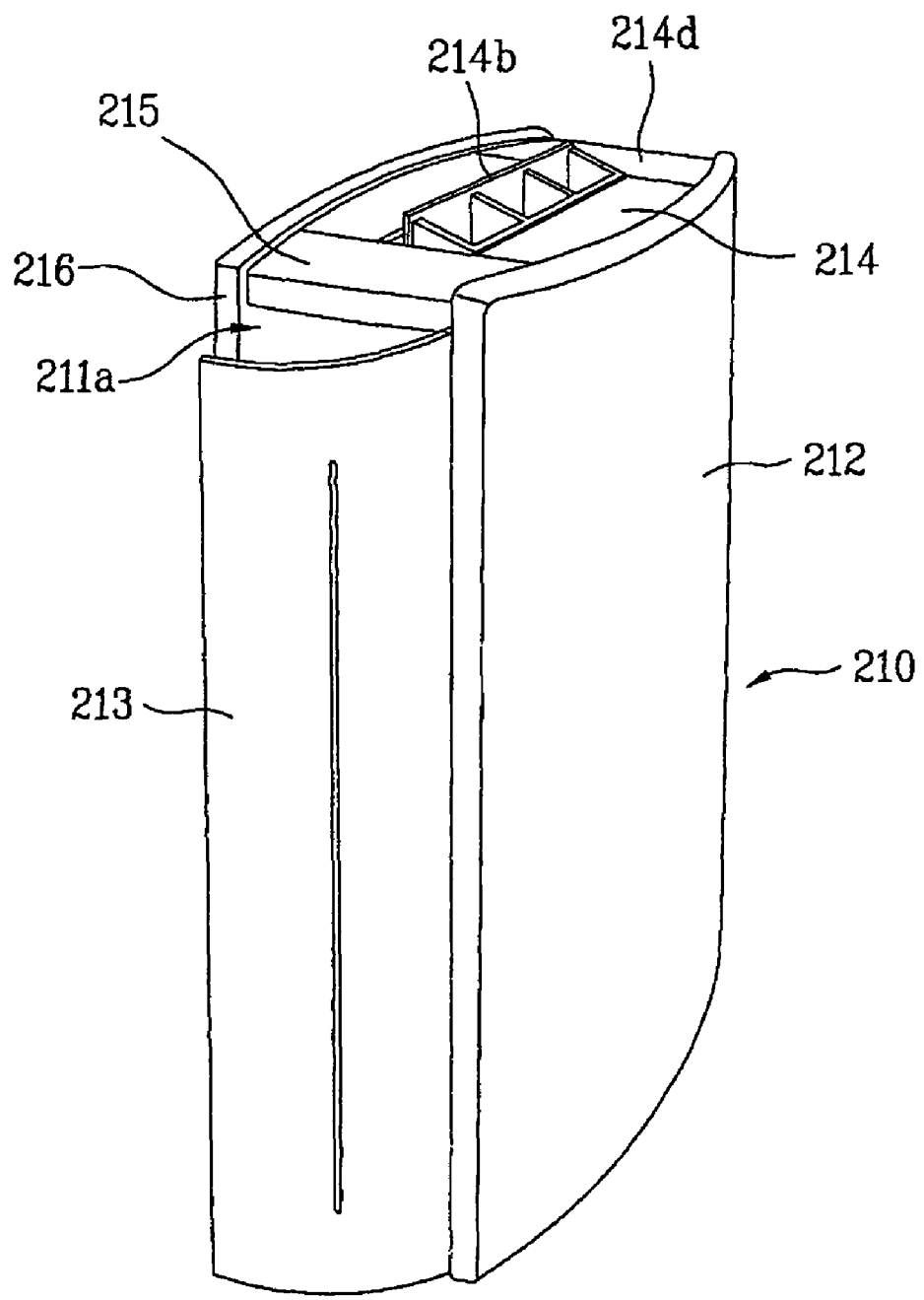
FIG. 16 illustrates a perspective view of a variation of the dehumidifier in FIG. 13 with the side panel moved out.

Or, different from the embodiment, the side panel 213a may be moved, not in the lateral direction, but up/down direction, or as shown in FIG. 16, may be rotated in the lateral direction, to form a gap for air flow between the front frame 211 or the rear frame 212 and the side panel 213a.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A hand-carriable dehumidifier comprising:
   a hand-carriable case having an inlet for introduction of air from a room thereinto and an outlet for discharging the air introduced through the inlet into the room, the outlet provided at a top surface of the hand-carriable case;
   a desiccant assembly provided inside the case for absorbing moisture from the air drawn through the inlet;
   a blower assembly provided inside the case for drawing into the case the air through the inlet and blowing the air to the room through the outlet;
   a regenerator assembly provided inside the case to blow hot air to the desiccant assembly for drying the desiccant assembly;
   a heat exchanger provided inside the case to receive the air from the inlet and to receive the air blown through the desiccant assembly by the regenerator assembly, and the heat exchanger to separate the moisture from the air received from the inlet and from the air received from the desiccant assembly; and
   a water collecting assembly provided inside the case for collecting water condensed and separated from the air at the heat exchanger,
   wherein the air blown from the regenerator assembly passes through a portion of the desiccant assembly, then passes through the heat exchanger, and then the air recirculates through another portion of the desiccant assembly.

2. The dehumidifier as claimed in claim 1, further comprising another inlet, and wherein the inlets are provided in at least two places.

3. The dehumidifier as claimed in claim 2, wherein the inlets are provided at a lower side of a front of the case and at a lower side of a rear of the case.

4. The dehumidifier as claimed in claim 2, wherein the inlets are provided at a lower side of one side of the case and at a lower side of an opposite side of the case.

5. The dehumidifier as claimed in claim 2, wherein the inlets are provided at one edge of one side of the case.

6. The dehumidifier as claimed in claim 1, wherein the desiccant assembly includes:
   a desiccant member to absorb moisture from air,
   a desiccant rotor rotatably mounted for housing the desiccant member,
   a desiccant rotor housing to rotatably support the desiccant rotor, and
   a rotating unit to rotate the desiccant rotor.

7. The dehumidifier as claimed in claim 6, wherein the rotating unit includes:
   a gear formed along an outside circumference of the desiccant rotor,
   a rotor driving gear to engage with the gear, and
   a rotor motor to provide a rotating power to rotate the rotor driving gear.

8. The dehumidifier as claimed in claim 1, wherein the blower assembly includes:
   a fan to generate a suction power for drawing air,
   a blower housing for housing and supporting the fan, and
   a fan motor, mounted on the blower housing, to rotate the fan.

9. The dehumidifier as claimed in claim 1, wherein the regenerator assembly includes:
   a regenerating fan to blow air toward the desiccant assembly, a regenerating motor to provide a rotating power for rotating the regenerating fan, and
a heater to heat the air blown by the regenerating fan.

10. The dehumidifier as claimed in claim 9, wherein the regenerator assembly further includes:
a regenerating fan housing for housing the regenerating fan, and
a heater case for casing the heater, wherein the heater case has one side in communication with the regenerating fan housing, and another side in communication with a portion of the desiccant assembly to guide air from the regenerating fan to the desiccant assembly.

11. The dehumidifier as claimed in claim 1, wherein the regenerator assembly includes:
a regenerating fan to blow air toward the desiccant assembly,
a regenerating fan housing for housing the regenerating fan,
a regenerating motor to rotate the regenerating fan,
a heater to heat the air blown by the regenerating fan,
a heater case for casing the heater, wherein the heater case has one side in communication with the regenerating fan housing, and another side in communication with a portion of the desiccant assembly to guide air from the regenerating fan to the desiccant assembly,
a regenerating cover to guide the air that passed through the desiccant assembly by the regenerating fan to an inside of the heat exchanger, and
a circulating duct to guide the air that passed through the heat exchanger to the regenerating fan.

12. The dehumidifier as claimed in claim 1, wherein the heat exchanger includes:
a plurality of tubes arranged at predetermined intervals,
an inlet to introduce air flowing through the desiccant assembly,
an outlet to discharge the air that was heat exchanged as the air flows through the tubes, and
a plurality of drain holes for draining condensed water from the tubes.

13. The dehumidifier as claimed in claim 1, wherein the water collecting assembly includes:
a drain pan under the heat exchanger to guide water from the heat exchanger to a lower side, and
a water tank under the drain pan so as to be movable to an inside/outside of the case for holding the water guided from the drain pan.

14. The dehumidifier as claimed in claim 13, wherein the water tank is mounted/dismounted through a front of the case.

15. The dehumidifier as claimed in claim 13, wherein the water tank is mounted/dismounted through one side of the case.

16. The dehumidifier as claimed in claim 1, wherein the water collecting assembly includes:
a drain pan to guide water from the heat exchanger to a lower side,
a base pan mounted under the drain pan for temporarily holding the water guided from the drain pan,
a water tank movable to an inside/outside of the case to hold the water from the base pan, and
a pump to pump the water from the base pan to the water tank.

17. The dehumidifier as claimed in claim 16, wherein the case includes a water tank opening at a top surface of the case for mounting/dismounting the water tank.

18. The dehumidifier as claimed in claim 17, further comprising a water tank opening cover on the top surface of the case for opening/closing the water tank opening.

19. The dehumidifier as claimed in claim 1, further comprising a discharge louver movably mounted at a discharge opening for opening/closing the outlet.

20. The dehumidifier as claimed in claim 19, wherein the discharge louver slides to open/close the outlet.

21. The dehumidifier as claimed in claim 19, wherein the discharge louver rotates to open/close the outlet.

22. The dehumidifier as claimed in claim 1, wherein the case includes:
a front frame of a box shape and having an opened rear, and
a rear frame of a box shape and having an opened front for coupling to the rear of the front frame.

23. The dehumidifier as claimed in claim 1, wherein the case includes:
a base pan,
a front frame coupled to a front of the base pan,
a rear frame coupled to a rear of the base pan,
two side panels coupled to opposite edges of the front frame and the rear frame, and
a top panel coupled to a top side of the front frame and to a top side of the rear frame.

24. The dehumidifier as claimed in claim 23, wherein the case includes inlets formed between one side edge of the front frame and the rear frame and front and rear edges of at least one of the side panels when the side panel is coupled to the front frame and the rear frame with a predetermined gap at the edges.

25. The dehumidifier as claimed in claim 1, wherein the hand-carriable case includes:
a base pan,
a front frame coupled to a front of the base pan,
a rear frame coupled to a rear of the base pan,
a top panel coupled to top sides of the front frame and the rear frame,
a first side panel fixedly secured to one side edge of each of the front frame and the rear frame, and
a second side panel mounted to the other side edge of each of the front frame and the rear frame so as to be movable in a lateral direction to open/close inlets formed between the second side panel and the front frame and the rear frame depending on a direction of movement of the second side panel.

26. The dehumidifier as claimed in claim 25, further comprising a driving unit for automatic movement of the second side panel.

27. The dehumidifier as claimed in claim 25, further comprising a guide unit to guide movement of the second side panel.

28. The dehumidifier as claimed in claim 1, further comprising a front panel mounted to a front of the case.

29. The dehumidifier as claimed in claim 28, wherein the front panel has at least one decoration selected from a picture, a photograph, a design, or a pattern, carved therein.

30. The dehumidifier as claimed in claim 28, wherein the front panel is rotatably mounted to the front of the case.

31. The dehumidifier as claimed in claim 30, wherein the front panel includes a fastening member for fastening/unfastening the front panel to/from the front of the case.

32. The dehumidifier as claimed in claim 1, further comprising a filter mounted on one side of the inlet to clean the air introduced through the inlet.

33. A hand-carriable dehumidifier comprising:
a hand-carriable case having an inlet for introduction of air from a room thereinto and an outlet for discharging the air introduced through the inlet into the room, the outlet provided at a top surface of the case;

a desiccant assembly provided inside the case, the desiccant assembly including a desiccant member to absorb moisture from the air drawn through the inlet, a desiccant rotor rotatably mounted for housing the desiccant member, and a rotating unit to rotate the desiccant rotor;

a blower assembly provided inside the case to draw into the case the air through the inlet and blowing the air to the room through the outlet;

a regenerator assembly provided inside the case to dry the desiccant assembly, the regenerator assembly including a regenerating fan to blow air to the desiccant assembly, a regenerating motor to provide a rotating power to rotate the regenerating fan, and a heater to heat the air blown by the regenerating fan;

a heat exchanger provided inside the case to receive the air from the inlet and to receive the air blown through the desiccant assembly by the desiccant assembly, and the heat exchanger to separate the moisture from the air received from the inlet and from the air received from the desiccant assembly; and a water collecting assembly provided inside the case to collect water condensed and separated from the air at the heat exchanger, wherein the air blown from the regenerator assembly passes through a portion of the desiccant assembly, then passes through the heat exchanger, and then the air recirculates through another portion of the desiccant assembly.

34. The dehumidifier as claimed in claim 33, wherein the heat exchanger includes:
a plurality of tubes arranged at intervals,
an inlet to introduce air flowing through the desiccant assembly,
an outlet to discharge the air that was heat exchanged as the air flows through the tubes, and
a plurality of drain holes to drain water from the tubes.

35. A dehumidifier comprising:
a hand-carriable case having an inlet for introduction of air from a room thereinto and an outlet for discharging the air introduced through the inlet into the room, the outlet provided at a top surface of the hand-carriable case;
a desiccant assembly provided inside the case, the desiccant assembly including a desiccant member to absorb moisture from the air drawn through the inlet, a desiccant rotor rotatably mounted to house the desiccant member, and a rotating unit to rotate the desiccant rotor;

a blower assembly provided inside the case to draw air through the inlet and to blow the air to the outlet;

a regenerator assembly provided inside the case to blow hot air to the desiccant assembly for drying the desiccant assembly;

a heat exchanger provided inside the case to receive the air from the inlet and to receive the air blown through the desiccant assembly by the regenerator assembly, and the heat exchanger to separate the moisture from the air received from the inlet and from the air received from the desiccant assembly; and a water collecting assembly provided inside the case to collect water condensed and separated from the air at the heat exchanger, wherein the air blown from the regenerator assembly passes through a portion of the desiccant assembly, then passes through the heat exchanger, and then the air recirculates through another portion of the desiccant assembly, wherein the regenerator assembly includes:
a regenerating fan to blow air toward the desiccant assembly,
a regenerating fan housing to house the regenerating fan,
a regenerating motor to provide a rotating power to rotate the regenerating fan,
a heater to heat the air blown by the regenerating fan,
a heater case to house the heater, the heater case having one side in communication with the regenerating fan housing, and another side in communication with a portion of the desiccant assembly to guide air from the regenerating fan to the desiccant member,
a regenerating cover to guide the air that passes through the desiccant assembly by the regenerating fan to an inside of the heat exchanger, and
a circulating duct to guide the air that passes through the heat exchanger to the regenerating fan.

36. The dehumidifier as claimed in claim 35, wherein the heat exchanger includes:
a plurality of tubes arranged at intervals,
an inlet to introduce air flowing through the desiccant assembly,
an outlet to discharge the air that was heat exchanged as the air flows through the tubes, and
a plurality of drain holes to drain water from the tubes.

* * * * *